Nov. 9, 1926.
W. A. RIDDELL
PHOTOGRAPHIC SHUTTER
Filed March 5, 1925
1,606,447
6 Sheets-Sheet 1
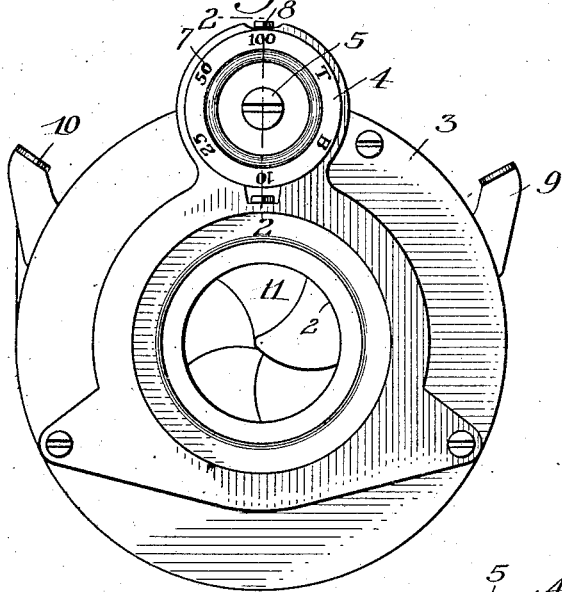
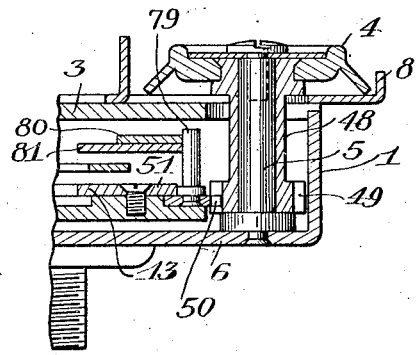
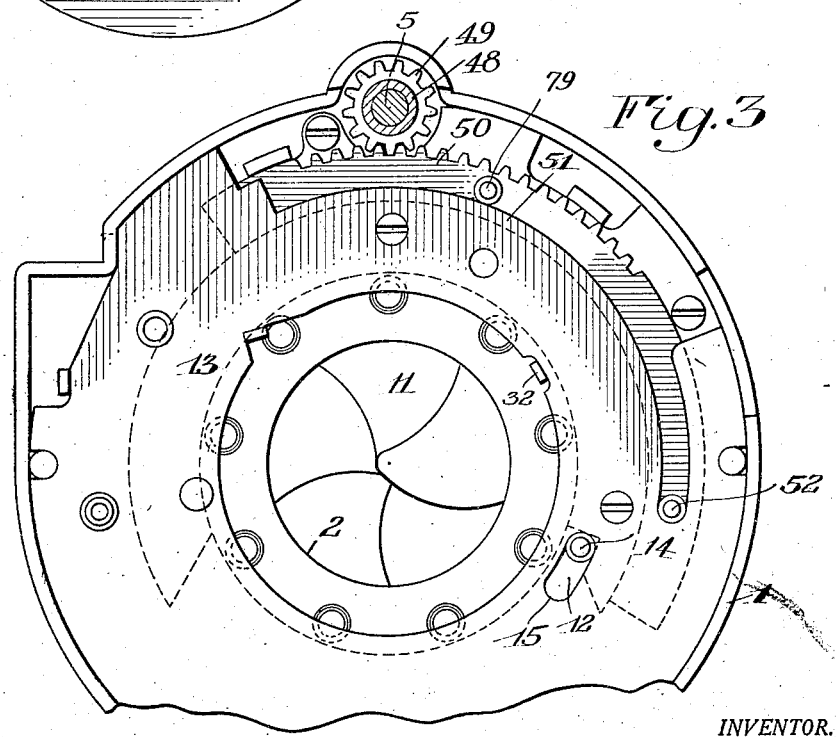
INVENTOR.
William A. Riddell
BY
Frederick D. Church
his ATTORNEY Nov. 9, 1926.  1,606,447
W. A. RIDDELL
PHOTOGRAPHIC SHUTTER
Filed March 5, 1925   6 Sheets-Sheet 2
Fig.1
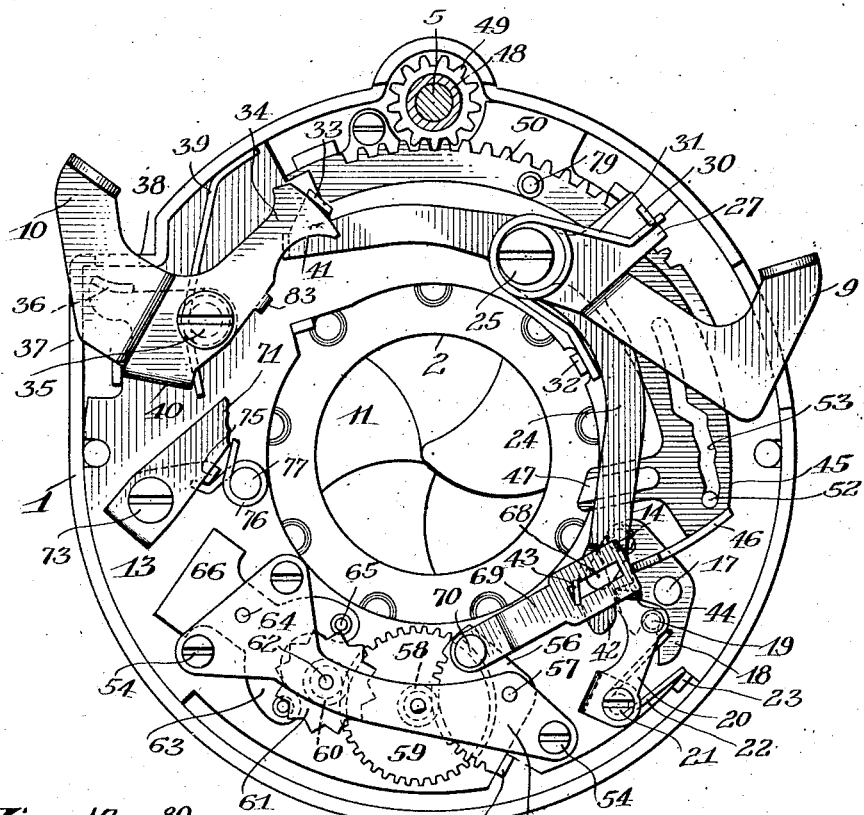
Fig.13
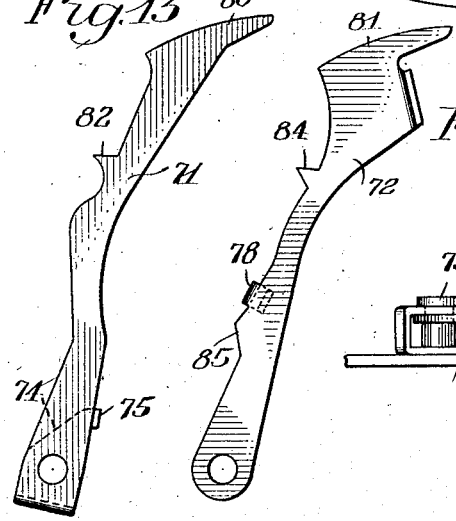
Fig.14
Fig.15
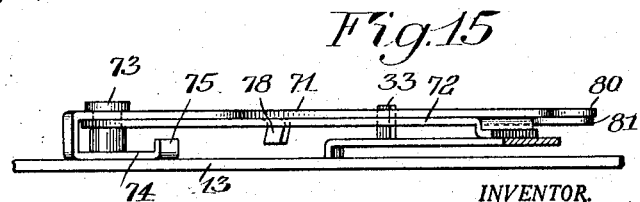
INVENTOR
William A. Riddell
BY
his ATTORNEY

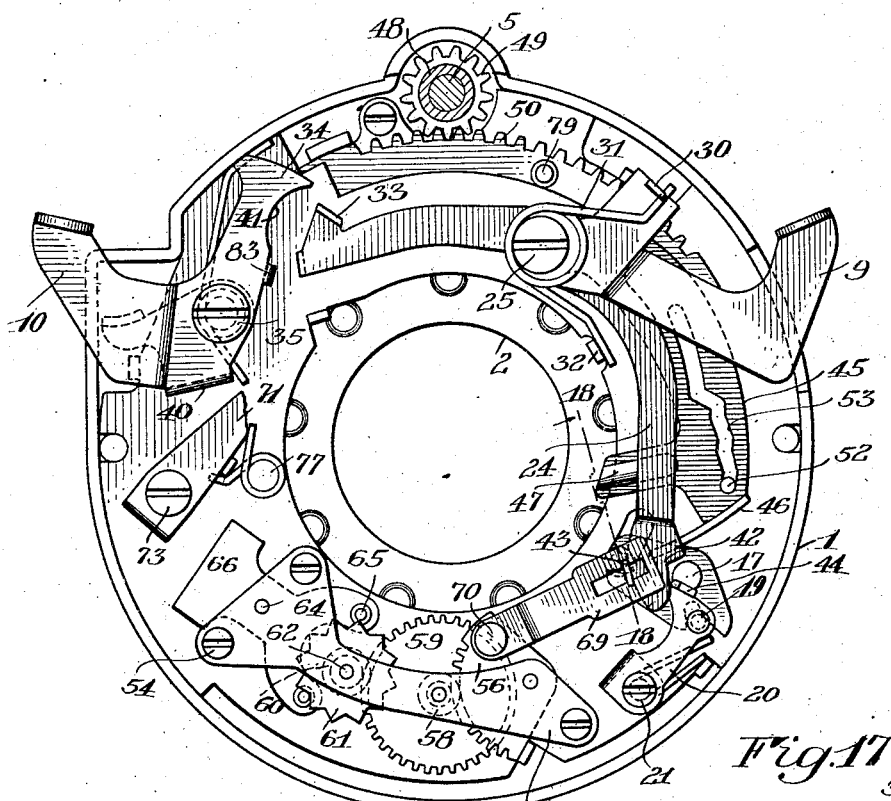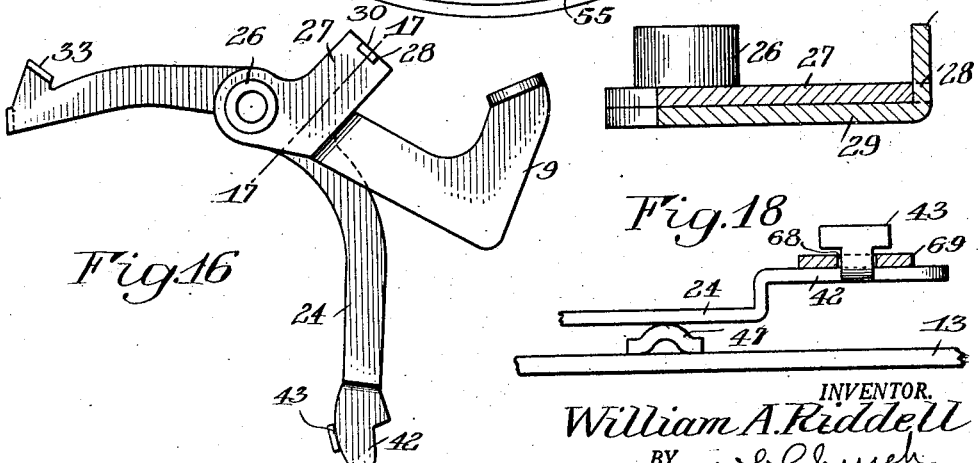

Nov. 9, 1926.

W. A. RIDDELL 1,606,447

PHOTOGRAPHIC SHUTTER

Filed March 5, 1925    6 Sheets-Sheet 4

INVENTOR.
William A. Riddell
BY
his ATTORNEY

Nov. 9, 1926.

W. A. RIDDELL

PHOTOGRAPHIC SHUTTER

Filed March 5, 1925    6 Sheets-Sheet 5

1,606,447

INVENTOR.
William A. Riddell
BY
his ATTORNEY

Nov. 9, 1926.

W. A. RIDDELL

PHOTOGRAPHIC SHUTTER

Filed March 5, 1925     6 Sheets-Sheet 6

1,606,447

INVENTOR.
William A. Riddell
BY
Frederick S. Church
his ATTORNEY

Patented Nov. 9, 1926.

1,606,447

UNITED STATES PATENT OFFICE.

WILLIAM A. RIDDELL, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC SHUTTER.

Application filed March 5, 1925. Serial No. 13,078.

My present invention relates to photography and more particularly to photographic shutters and it has for its object to provide an improved shutter of the pivoted blade type with a simple and efficient retarding mechanism that can be easily controlled with great accuracy. The improvements relate to the manner in which the retarding mechanism is brought into or thrown out of action and a further object of the invention is to improve the time and bulb adjustments of the shutter in connection with the retarding mechanism through the use of a common adjusting or regulating element of simple construction and adapted to be manipulated with facility. To these and other ends the invention resides in certain improvements and combinations of parts all as will be hereinafter more fully described, the novel features being pointed out in the claims at the end of the specification.

In the drawings—

Figure 1 is a front elevation of a shutter constructed in accordance with and illustrating one embodiment of my invention;

Figure 2 is an enlarged fragmentary section through the setting disk taken on the line 2—2 of Figure 1;

Figure 3 is an enlarged view of the blade and setting mechanism in the interior of the shutter with a portion of the case broken away and showing the setting device in a position for an instantaneous or most rapid exposure;

Figure 4 is an enlarged view of the interior mechanism with the cover plate removed and showing the retarding mechanism set for an instantaneous exposure with the shutter blades closed;

Figure 5 is a similar view with the shutter tripped and the blades open;

Figure 13 is a fragmentary plan view of the bulb stop lever;

Figure 14 is a detail plan view of the time stop lever;

Figure 15 is a fragmentary detail edge view or side elevation of the time and bulb stops;

Figure 16 is a detail plan view of the setting lever and master member;

Figure 17 is an enlarged section taken on the line 17—17 of Figure 16 and

Figure 18 is an enlarged fragmentary detail section taken substantially on the line 18—18 of Figure 5.

Similar reference numerals throughout the several views indicate the same parts.

Figure 6:
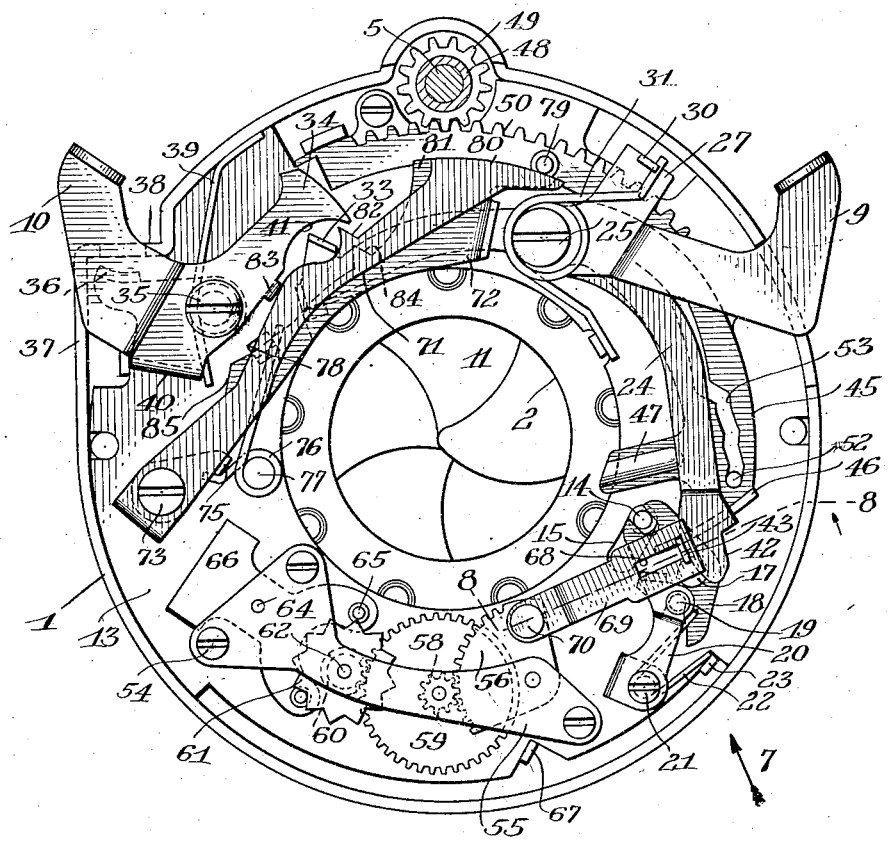
Figure 6 is a view similar to Figures 4 and 5 with the same adjustment of the regulating and timing mechanism but showing the shutter closed as at the conclusion of an exposure or before the shutter is set.
Figure 7:
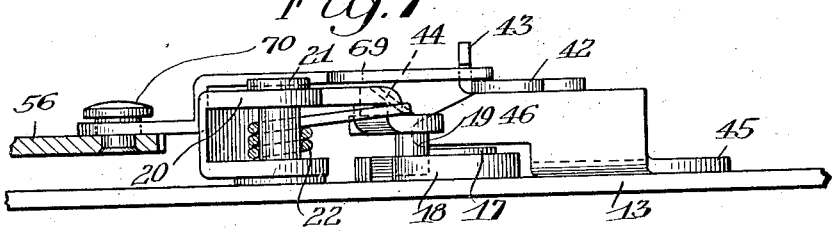
Figure 7 is an enlarged fragmentary elevation partly in section of a portion of the retarding mechanism looking in the direction of the arrow indicated at 7 in Figure 6.
Figure 8:
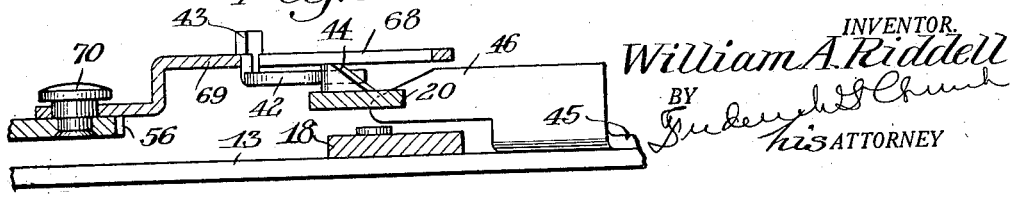
Figure 8 is an enlarged fragmentary section through the retarding mechanism taken on the line 8—8 of Figure 6.

In the present embodiment my improvements are shown applied to a shutter of the "set" type as distinguished from one of the "automatic" type and the usual modern circular model is shown wherein the mechanism is housed in an annular space within a casing 1 having a lens opening 2 and having a cover plate 3. The cover plate is removed in most of the views to disclose the interior mechanism. The shutter is adapted for instantaneous exposures of regulatable duration within a wide range of durations controlled by the retarding mechanism constituting a part of the present improvements. It is also adapted for time and bulb exposures through a mechanism that also constitutes a part of the present invention.

The regulator embodies a rotary disk 4 turning on a post 5 secured in the back plate 6 of the shutter casing and carrying designating characters 7 for settings of time, bulb and instantaneous exposures of various fractions of seconds. These characters are successively brought into register with an indicator 8 to give the reading, in the usual manner, of the setting of the shutter through mechanism hereinafter described.

The setting lever is shown at 9, the operating or releasing lever at 10 and the blades at 11.

The blade mechanism is of the usual type embodying a blade ring 12 arranged beneath the mounting plate 13 (Figure 3) on which most of the mechanism hereinafter described is carried. A partial rotation of the ring in one direction rocks the blades on their pivots and opens them while a reverse movement closes them. The blade ring 12 carries a pin 14 which pin projects through a slot 15 in the mounting plate 13 and is engaged by the fork 16 of an oscilatory member pivoted to the plate 13 at 17. Another fork or bifurcation 18 of this member is engaged by a depending pin 19 on an actuator 20 pivoted at 21. A spring 22 encircling the pivot 21 and bearing against a lug 23 on the plate 13 and against a convenient portion of the actuator tends to press it toward the center of the shutter and cause it to move the oscillatory member in a direction to hold the blades closed as in Figure 11 for instance. It will be seen from this that the actuator 20 can be moved in one direction to open the blades and will automatically move in the other direction to close them.

The setting lever 9 is rigidly connected to a master lever 24 pivoted at 25. The construction is shown in Figures 16 and 17. Riveted in the master lever 24 is a bearing collar 26 over which bearing collar the setting lever 9 is placed. The setting lever is made of sheet material doubled on itself to form an arm 27 having a notch 28 therein. The master lever is fitted with a similar underlying arm 29 having an ear 30 that takes into the notch 28 and locks the two members for joint rotation. This construction is simple and of great convenience in assembling the shutter.

The master lever is actuated in a counterclockwise direction by a main shutter spring 31 encircling the sleeve 26 and bearing at one end against the ear 30 and the other against an ear 32 on the mounting plate 13. Upon depressing the setting lever 9 which is practically a part of the master lever a shoulder 33 on the outer end thereof engages with a latch arm 34 on the operating lever 10 as shown in Figure 4. This operating lever is yoke shaped to give a double bearing on its pivot pin 35 and the lower arm of the yoke shown in dotted lines in several of the views at 36 occupies an extension 37 of the shutter case. It is opposite an opening 38 also shown in dotted lines through which a cable or alternate release may be used to trip the operating lever in the usual manner. A spring 39 encircling the pivot 35 and bearing at one end against the shutter wall and at the other against the connecting portion 40 of the operating lever tends to hold the latch arm 34 in engaging position as shown in Figure 4. Depressing the operating lever 10 releases the latch arm against the tension of spring 39 and when the master lever is thereafter set it displaces the latch 34 by reason of the shoulder 33 riding against a cam portion 41 thereon.

The other arm of the master lever 24 is provided with an offset tip 42 best shown in Figure 16, on the left side of which is a T-shaped lug 43. As the master lever is set and the main spring 31 energized the tip 42 engages in front of a shoulder 44 on the actuator 20. When the master lever is released, it stays in engagement with the shoulder 44 long enough to open the blades against the tension of the actuator spring 22 and thereafter slides off of the shoulder and allows the blades to close. Its disengagement is brought about through the fact that the master lever is a spring lever and is adapted to yield upwardly or forwardly to clear the lug 44 in the manner hereinafter described.

Turning on the same pivot 25 with the master lever and setting member is a tripping device 45 having a cam 46 lying in the path of the master member 24. After opening the blades through engagement with shoulder 44 the tip 42 of the master member strikes this cam and is deflected out of engagement with the shoulder at an early or late point in its travel according to the duration of the exposure desired. An extension 47 on the tripping device 45 affords a bearing for the master member before it engages the cam 46.

The tripping device 45 is controlled in its position by the regulating disk 4. Referring to Figures 2 and 4 for instance, there is fastened to the regulating disk 4 a sleeve 48 turning on the pivot 5 and terminating at a pinion 49. This pinion meshes with a ring gear 50 secured by gibs 51 to the mounting plate 13 which ring gear carries a pin 52 occupying a slot 53 in the tripping device 45. This slot 53 is a cam slot of the peculiar shape shown so that as the ring gear is turned through the adjustments of the regulating disk 4, the pin 52 will occupy different positions in the slot and carry the cam 46 forward and back in the path of the master lever to trip the same at the proper point. In Figures 3, 4 and 6 the ring gear is so adjusted that the pin 52 occupies the lower end of the slot 53 for an instantaneous exposure. Moving it upwardly causes the tripping cam 46 to recede giving progressively longer exposures while the upper straight portion of the slot 53 when in cooperation with the pin 52, gives time and bulb exposures as in Figures 9 and 11, the tripping device and its cam 46 being then withdrawn to such a point that the shoulder 44 on the actuator slips off the end of the tip 42 of the master lever after an instant closing of the blades before the said tip engages the cam 46 at all and the latter becomes ineffective for any purpose.

With the so called instantaneous exposures that is automatically timed exposures as distinguished from bulb and time exposures, a retarding device is employed in addition to the tripping cam 46. Secured to the mounting plate 13 by screws 54 (Figures 4, 5 and 6) is a bridge plate 55 that, jointly with the mounting plate, provides bearings for a gear train and escapement mechanism. This embodies a gear segment 56 pivoted at 57 and meshing with a pinion 58 fixed to a gear 59. The gear 59 in turn meshes with a pinion 60 on a star wheel 61 turning on a shaft 62 so that the star wheel is rapidly rotated with a slight movement of the segment 56 in the usual manner of an escapement. An anchor or pallet 63 pivoted at 64 and in the form of a yoke embracing the star wheel has pins 65 cooperating with it so that it is vibrated by the rotation of the star wheel under the inertia of a weight 66 at the other end. The driving of the train affords a uniform resistance to the actuating force in the customary manner of an escapement. The normal position of the gear segment 56 is shown in Figure 6 but when the shutter is set it is moved to the position of Figure 4 determined by its engagement with a lug 67 on the mounting plate 13.

As previously stated, the master lever 24 is provided with a T-shaped lug 43 which operates in a slot 68 in a link 69 which is pivoted to the gear segment 56 by a wrist pin 70. The normal position of the parts when the shutter is set and is arranged for an instantaneous exposure is shown in Figure 5. With the parts in the position there shown, when the setting lever 9 is depressed, the master lever 24 moves to the position shown in Figure 4. In so doing the lug 43 thereon first moves idly in the slot 68 and then engages the link 69 to move the segment 56 against its stop 67 which may be said to wind up or set the retarding mechanism. When the master lever is tripped by depressing the operating lever 10 and it moves in the opposite direction under the influence of main shutter spring 31, it first moves idly in the slot 68 while engaging the shoulder 44 on actuator 20 to open the blades as in Figure 5. There is thus, temporarily, no drag upon the master member during this period which results in a rapid opening of the blades. Immediately after the blades have opened, the lug 43 reaches the outer end of slot 68 and picks up the link 69. From there on in the movement of the master lever the gear train and escapement are brought into action through the swinging of the gear segment 56 by the link 69 and a drag is applied that slows the movement of the master lever while the blades are open and until the master lever is tripped laterally from engagement with the shoulder 44 according to the early or late position of the cam 46 on the tripping member 45. For instance, for a really instantaneous exposure, that is, one of the shortest possible duration, the cam 46 is set at an advanced point in the path of the master lever as in Figures 4 and 5. The result is that by the time the lug 43 reaches the end of the slot 68 and before it can pick up the link 69 and move the retarding mechanism at all, it engages the cam 46 and completes its effective movement by allowing the blades to close.

Figure 9:
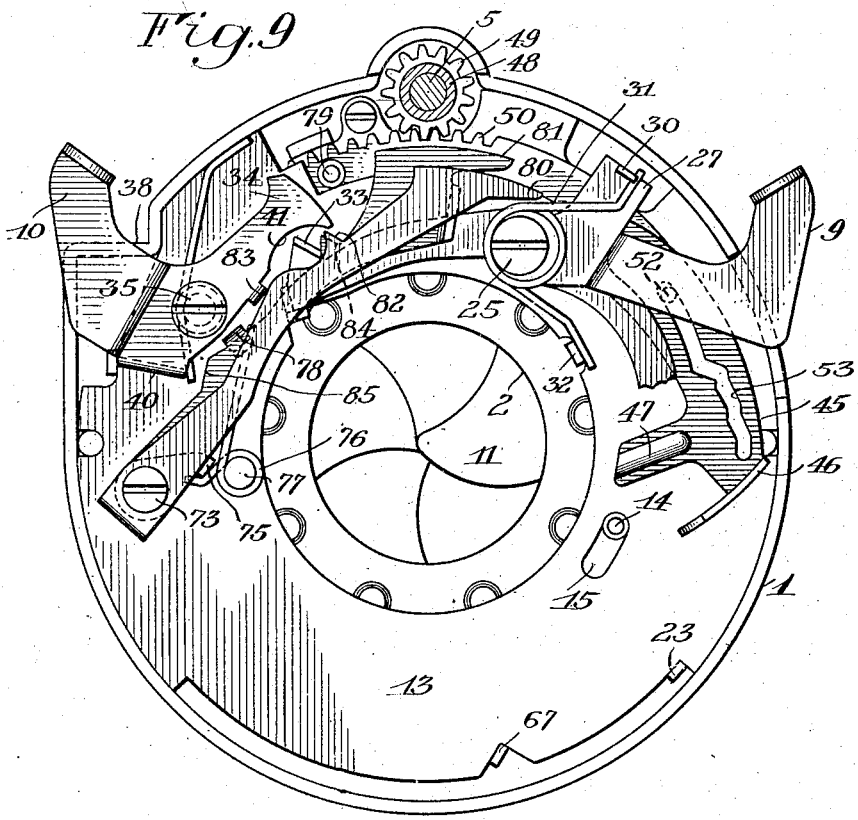
Figure 9 is an enlarged plan view of the interior mechanism showing the time and bulb stops and the regulator set for a time exposure.
Figure 10:
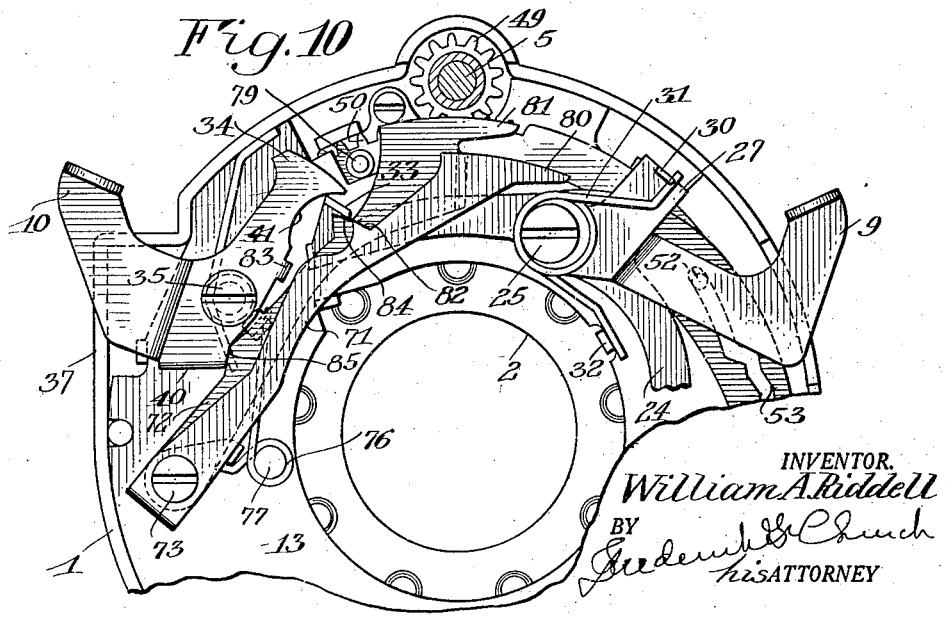
Figure 10 is a fragmentary view similar to Figure 9 but showing the parts in the positions occupied during a time exposure, the blades being open.
Figure 11:
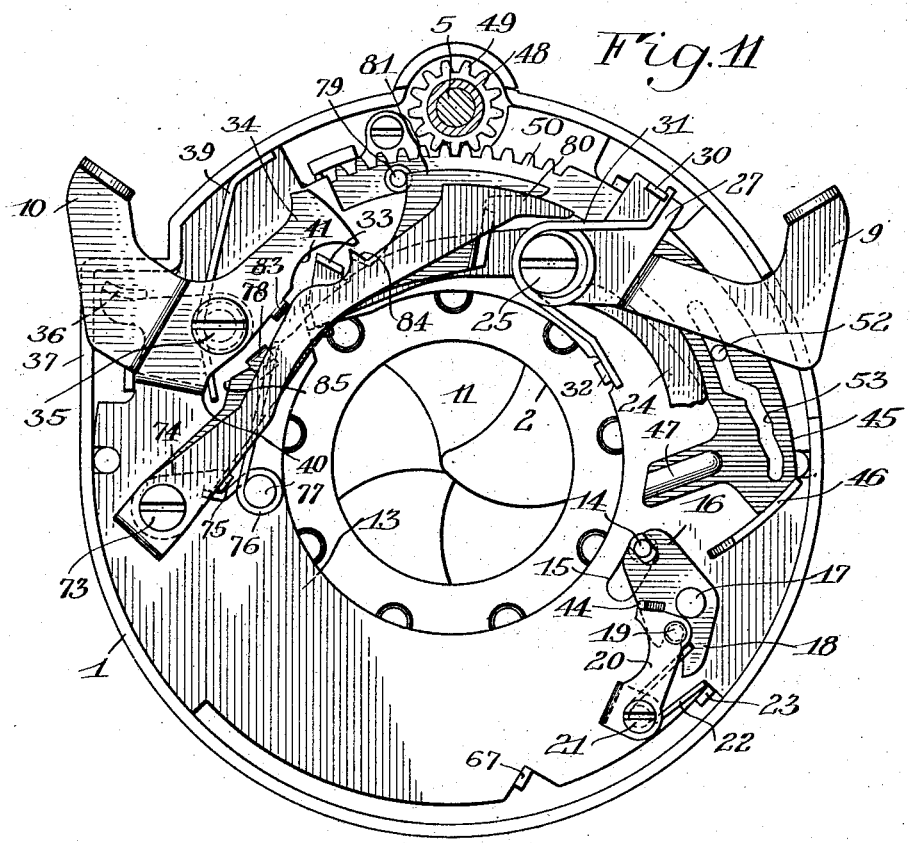
Figure 11 is a view similar to Figure 9 showing the regulator set for a bulb exposure but with the blades closed.

When the shutter is set for a time or bulb exposure, the cam 46 is moved so far out of the way as in Figures 11 and 9 that it gives time for the master lever to be halted with the blades open in a manner about to be described and to then take a further movement on a second release before it is disengaged by the cam from the shoulder 44.

The bulb and time levers 71 and 72 are shown, respectively, in Figures 13 and 14. Both turn on the same pivot 73 secured to the mounting plate 13. The bulb lever 71 is yoke shaped to the extent that it is provided with a short arm 74 having an ear 75 thereon. A spring 76 coiled about a stud 77 has one end engaging the ear 75 and the other end engaging an ear 78 on the time lever 72 which, as shown in Figure 15, is pivoted beneath the bulb lever 71 or between it and its arm 74. The action of this spring 76 is such as to tend to move both levers 71 and 72 in a counter clockwise direction or toward the operating lever 10 and the latch arm 34 thereof.

Figure 12:
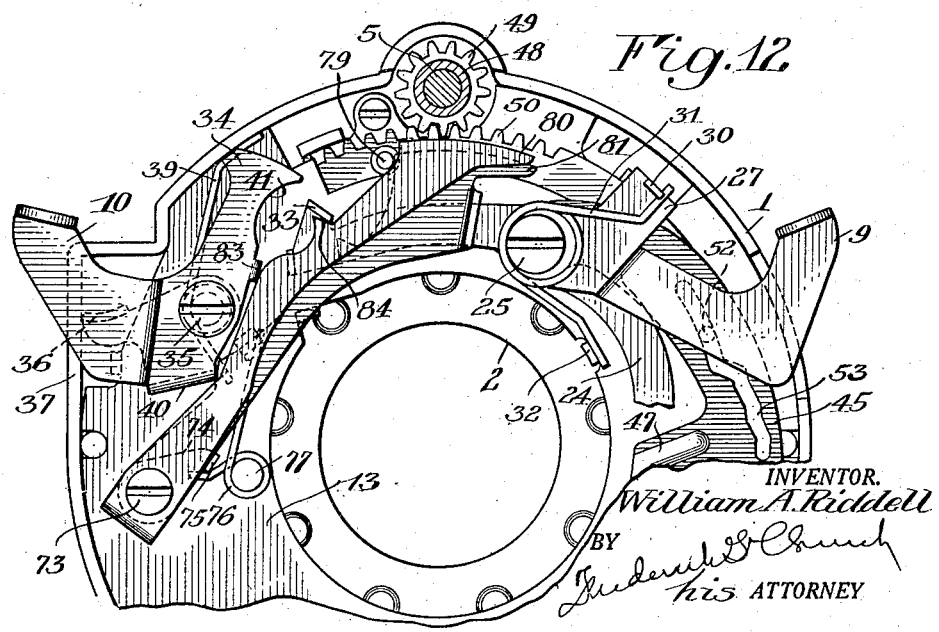
Figure 12 is a fragmentary view similar to Figure 11 but with the blades open.

When the regulating mechanism embodying the disk 4 is set for an instantoneous exposure as previously described, and the ring gear 50 is correspondingly rotated, a pin 79 on the latter rides upon two coincident cam surfaces 80 and 81 on the bulb and time levers and depresses them in a clockwise direction so that they are inoperative and do not interfere with the engagement or disengagement of the shoulder 33 of the master member 24 with the latch arm 34 of the operating lever 10. When, however, the adjusting or regulating member 4 is used to move the ring gear 50 to the position of Figure 11 the pin 79 engages the heel of the cam surface 81 on the time lever 72 and holds that lever inoperative or retracted as shown in Figure 11 without, however, interfering with bulb lever 71. Bulb lever 71 is provided with a stop shoulder 82. This stop shoulder moves into the path of shoulder 33 on the master lever 24 when stop shoulder 33 is released from the latch arm 34 due to the depression of operating lever 10 by virtue of the fact that while a lug 83 on the operating member normally holds bulb lever 71 in the inoperative position of Figure 11 (the operating lever spring 39 being superior to bulb and time stop lever spring 76) the release of the operating lever 10 allows bulb lever 71 to spring back to inoperative position as shown in Figure 12 and catches the shoulder 33 of the master lever after its release from latch arm 34 before the master lever has moved sufficiently to close the blades after opening them. In the meantime, time stop lever 72 is being held inoperative by pin 79 on the ring gear. Thus, in Figure 12 with the one downward actuation of or pressure upon the operating lever 10 the shoulder 33 on the master lever is caught on the stop shoulder 82 of the bulb lever to hold the blades open. With the release of the operating member 10 the lug 83 thereon throws the bulb lever 71 back to inoperative position of Figure 11 and the master lever completes its movement closing the blades. In this way the depression and subsequent release of the operating member 10 causes a bulb or opening and closing movement of the blades.

When a time exposure is desired the ring gear 50 through the regulator 4 is moved to the position of Figure 9. This releases pin 79 on the ring gear from contact with either the bulb lever 71 or the time lever 72 both of which latter are urged by their spring 76 in a counter clockwise direction toward the operating lever 10 and toward the path of the shoulder 33 on the master lever when released. Time lever 72 is also provided with a stop shoulder 84. The shutter being set for time exposure, when the shoulder 33 of the master lever is released from latch arm 34 with the depression of operating lever 10, it first catches on stop shoulder 82 of the bulb lever as in Figure 12, the connecting or yoke portion 40 of the operating lever engaging a portion 85 of the time lever 72 to momentarily throw it into inoperative position. When, however, the operating lever 10 is released, the lug 83 thereon retracts the bulb lever 71 as before or as in a bulb exposure but it simultaneously withdraws from shoulder 85 of the time stop lever 72 allowing the latter to move into operative position under the influence of spring 76. The result is that shoulder 33 on the master lever drops from stop shoulder 82 on the bulb lever to stop shoulder 84 on the time lever and is there halted with the blades open. The operating lever 10 having returned to normal position under the influence of its own spring 39, a further actuation or depression thereof is necessary to complete the time exposure, namely, to close the blades. When this is done, portion 40 of the operating lever again engages shoulder 85 on time stop lever 72 and retracts the latter or moves it to inoperative position whereupon shoulder 33 of the master lever drops off of stop shoulder 84 and the blades are closed.

I claim as my invention:

1. In a photographic shutter, the combination with blade mechanism and a master member adapted to actuate the same, of a retarding device embodying a gear train and a slotted link pivoted to an element of the train, the master member being provided with a portion engaging in the slot of the link to operate the retarding device in two directions but having a lost motion in the slot during the opening of the blades.

2. In a photographic shutter, the combination with blade mechanism and a master member adapted to actuate the same, of a retarding device embodying a gear train and segment and a slotted link pivoted to the segment, the master member being provided with a portion engaging in the slot of the link to operate the retarding device in two directions but having a lost motion in the slot during the opening of the blades.

3. In a photographic shutter, the combination with blade mechanism and a master member adapted to actuate the same, of a retarding device embodying a gear train and a connecting element between the master member and the retarding device for actuating the latter in two directions, the master member having a lost motion connection with the connecting member to permit the blades to be opened independently of the retarding device.

4. In a photographic shutter, the combination with blade mechanism embodying a ring movable in two directions to open and close the blades with such respective movements, said ring being provided with an operating pin, of an operating lever having two slotted arms one of which engages the said pin, a pivoted actuator having a pin in constant engagement with the slot of the other arm during all positions of the blades, a spring acting on the actuator to normally hold the blades closed and a master member adapted to engage the actuator and to then be released therefrom.

5. In a photographic shutter, the combination with blade mechanism including a blade ring and actuating devices therefor, of a master member having a slip off engagement with the actuating mechanism, a movable cam for regulating the slip off point of the master member, said cam being carried on an arm having an extension constituting a track for supporting and guiding the master member.

6. In a photographic shutter, the combination with blade mechanism, an actuator therefor and a master lever adapted to engage the actuator momentarily and then slip off of the same, of an arm provided with a cam slot and with a cam for releasing the master lever from the actuator at a predetermined point to regulate the duration of exposure and a ring gear having a pin thereon engaging in the cam slot to change the position of the arm as the ring gear is turned.

7. In a photographic shutter, the combination with blade mechanism, an actuator therefor and a master lever adapted to engage the actuator momentarily and then slip off of the same, of an arm provided with a cam slot and with a cam for releasing the master lever from the actuator at a predetermined point to regulate the duration of exposure, a ring gear having a pin thereon engaging in the cam slot to change the position of the arm as the ring gear is turned, and a rotary regulator on the exterior of the shutter meshing with the ring gear.

8. In a photographic shutter, the combination with blade mechanism, an actuator therefor and a master lever adapted to engage the actuator momentarily and then slip off of the same, of an arm provided with a cam slot and with a cam for releasing the master lever from the actuator at a predetermined point to regulate the duration of exposure, a ring gear having a pin thereon engaging in the cam slot to change the position of the arm as the ring gear is turned, time and bulb stops for the master lever and means on the ring gear for throwing either or both of said stops to inoperative positions.

9. In a photographic shutter, the combination with blade mechanism, actuating mechanism therefor and a master member cooperating with the actuating mechanism, of time and bulb stops having a normal tendency to occupy the path of the master member and an operating lever adapted to hold the master member in set position and having different points of contact with the time and bulb levers to alternately move them to inoperative positions.

10. In a photographic shutter, the combination with blade mechanism, actuating mechanism therefor and a master member cooperating with the actuating mechanism, of time and bulb stops having a normal tendency to occupy the path of the master member, a pivoted operating lever adapted to hold the master member in set position and having different points of contact on opposite sides of its pivot with the time and bulb levers respectively to alternately move them to inoperative positions.

11. In a photographic shutter, the combination with blade mechanism, of means for operating the same comprising a stud, a master lever turning thereon and a separate setting lever mounted on the stud to overlie the master lever and detachably interlocked therewith.

12. In a photographic shutter, the combination with blade mechanism, of means for operating the same comprising a stud, a master lever turning thereon and having an extension provided with a lug and a separate setting lever mounted on the stud to overlie the master lever and provided with a notched arm detachably interlocked with the lug on the master lever.

WILLIAM A. RIDDELL.